(12) United States Patent
Kondo et al.

(10) Patent No.: US 10,377,228 B2
(45) Date of Patent: Aug. 13, 2019

(54) VEHICLE DUCT STRUCTURE

(71) Applicant: TOYOTA JIDOSHA KABUSHIKI KAISHA, Toyota-shi (JP)

(72) Inventors: Shingo Kondo, Toyota (JP); Masaya Tadatsu, Toyota (JP); Akihito Hosoi, Anjo (JP); Kouichi Yonemura, Miyoshi (JP); Kiwamu Inui, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/862,685

(22) Filed: Jan. 5, 2018

(65) Prior Publication Data

US 2018/0257482 A1 Sep. 13, 2018

(30) Foreign Application Priority Data

Mar. 8, 2017 (JP) ................. 2017-043815

(51) Int. Cl.
*B60K 13/04* (2006.01)
*B60K 13/02* (2006.01)
*B60K 11/08* (2006.01)
*B60K 1/04* (2019.01)
*B60K 11/06* (2006.01)
*B60K 1/00* (2006.01)

(52) U.S. Cl.
CPC ............... *B60K 13/04* (2013.01); *B60K 1/04* (2013.01); *B60K 11/06* (2013.01); *B60K 11/08* (2013.01); *B60K 2001/005* (2013.01); *B60K 2001/006* (2013.01); *B60K 2001/0438* (2013.01)

(58) Field of Classification Search
CPC ......... B60K 11/08; B60K 11/04; B60K 11/06; B60K 11/02; B60K 13/02; B60K 13/06; B60K 2001/003; B60K 2001/005; B60K 2001/006

See application file for complete search history.

(56) References Cited

U.S. PATENT DOCUMENTS 4,653,788 A * 3/1987 Di Giusto .............. B60K 11/08
188/264 A
5,860,685 A * 1/1999 Horney .................. B60K 13/02
180/68.1

(Continued)

FOREIGN PATENT DOCUMENTS

| JP | 2006-103365 | 4/2006 |
| JP | 2010-004649 | 1/2010 |
| JP | 2013-169897 | 9/2013 |

*Primary Examiner* — James A Shriver, II
*Assistant Examiner* — Vaughn Coolman
(74) *Attorney, Agent, or Firm* — Oblon, McClelland, Maier & Neustadt, L.L.P.

(57) ABSTRACT

An air intake duct is fixed to the lower surface of the rear floor panel of a vehicle. An oil cooler, which is an object to be cooled, is fixed to the lower surface of the air intake duct. An exhaust duct, which discharges air supplied to the oil cooler to the outside of the vehicle, is fixed to the lower surface of the oil cooler. The exhaust duct includes an exhaust port, which is open to the outside of the vehicle and is open downward from the vehicle. The intake duct includes an intake port, which is open to the outside of the vehicle and is opened at a position posterior to the rear tires of the vehicle, in other words, is opened in the rear wall portion of the rear bumper.

5 Claims, 3 Drawing Sheets

(56) References Cited

U.S. PATENT DOCUMENTS

| | | | | |
|---|---|---|---|---|
| 6,431,299 B1* | 8/2002 | Asche | B60K 11/08 | 180/68.1 |
| 6,457,542 B1* | 10/2002 | Hosono | B60K 6/22 | 180/68.1 |
| 7,069,893 B2* | 7/2006 | Cusumano | F02M 35/022 | 123/184.21 |
| 7,270,206 B2* | 9/2007 | Guertler | B60K 11/06 | 180/309 |
| 7,380,623 B2* | 6/2008 | Kim | F01N 3/05 | 180/68.1 |
| 7,654,351 B2* | 2/2010 | Koike | B60K 1/04 | 180/68.1 |
| 7,905,308 B2* | 3/2011 | Abe | H01M 2/1077 | 180/68.5 |
| 8,567,543 B2* | 10/2013 | Kubota | B60K 1/04 | 180/68.5 |
| 8,672,067 B2* | 3/2014 | Ajisaka | B60H 1/00535 | 165/41 |
| 8,820,451 B2* | 9/2014 | Matsumoto | B60K 1/04 | 180/65.1 |
| 8,944,199 B2* | 2/2015 | Fukunaga | B60K 11/06 | 180/68.5 |
| 9,490,459 B2* | 11/2016 | Takizawa | H01M 10/625 | |
| 9,623,741 B2* | 4/2017 | Honda | B60K 1/04 | |
| 9,669,703 B2* | 6/2017 | Kosaki | B60K 1/04 | |
| 9,873,456 B2* | 1/2018 | Hara | B60K 1/04 | |
| 9,950,611 B2* | 4/2018 | Pfeiffer | B60K 11/08 | |
| 2003/0037983 A1* | 2/2003 | Hanaya | B60K 13/04 | 180/309 |
| 2003/0168267 A1* | 9/2003 | Borroni-Bird | B60G 3/18 | 180/68.1 |
| 2004/0231898 A1* | 11/2004 | Hochkoenig | B60K 11/06 | 180/68.1 |
| 2007/0154757 A1* | 7/2007 | Okazaki | B60K 1/04 | 429/438 |
| 2009/0120620 A1* | 5/2009 | Abe | H01M 2/1077 | 165/104.31 |
| 2009/0317692 A1 | 12/2009 | Matsumoto et al. | | |
| 2011/0011654 A1* | 1/2011 | Kubota | B60K 1/04 | 180/65.21 |
| 2013/0168167 A1* | 7/2013 | Matsumoto | B60K 1/04 | 180/65.31 |
| 2017/0267094 A1* | 9/2017 | Pfeiffer | B60K 11/08 | |

* cited by examiner

VEHICLE DUCT STRUCTURE

BACKGROUND OF THE INVENTION

The present invention relates to a vehicle duct structure.

A drive motor by which a vehicle is allowed to travel and a power-supply unit from which electric power is supplied to the drive motor are mounted on an electric vehicle disclosed in Japanese Laid-Open Patent Publication No. 2006-103365. This electric vehicle is provided with an air intake duct that supplies outside air to the power-supply unit and an exhaust duct that discharges air supplied to the power-supply unit to the outside of the vehicle. An exhaust port of the exhaust duct is provided in the floor panel, and is open downward from the vehicle. An intake port of the air intake duct is provided at a rear wheel well, which covers a rear tire from above, and the intake port is open to the rear tire.

In order to open the intake port of the air intake duct in the rear wheel well as in the above-described electric vehicle, an arrangement space for the air intake duct must be provided in the rear wheel well or the surroundings of the rear wheel well. However, in many cases, vehicle doors or related members are mounted in the surroundings of the rear wheel well. Therefore, it is impossible to provide an arrangement space for the air intake duct in the surroundings of the wheel well inside the vehicle. Therefore, when the air intake duct of the electric vehicle mentioned in the aforementioned document is employed, the number of vehicle types that are capable of employing the position of the intake port of the air intake duct is limited. Therefore, this air intake duct lacks versatility.

SUMMARY OF THE INVENTION

An objective of the present invention is to provide a versatile structure of an air intake duct that supplies outside air to an object to be cooled.

To achieve the foregoing objective and in accordance with a first aspect of the present disclosure, a vehicle duct structure that includes an air intake duct and an exhaust duct is provided. The air intake duct supplies air from outside to an object to be cooled mounted at a position below a floor panel of a vehicle. The exhaust duct discharges air supplied to the object to be cooled to outside of the vehicle. The exhaust duct includes an exhaust port, which is open to the outside of the vehicle and is open downward from the vehicle. The intake duct includes an intake port, which is open to the outside of the vehicle and is opened at a position posterior to rear tires of the vehicle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
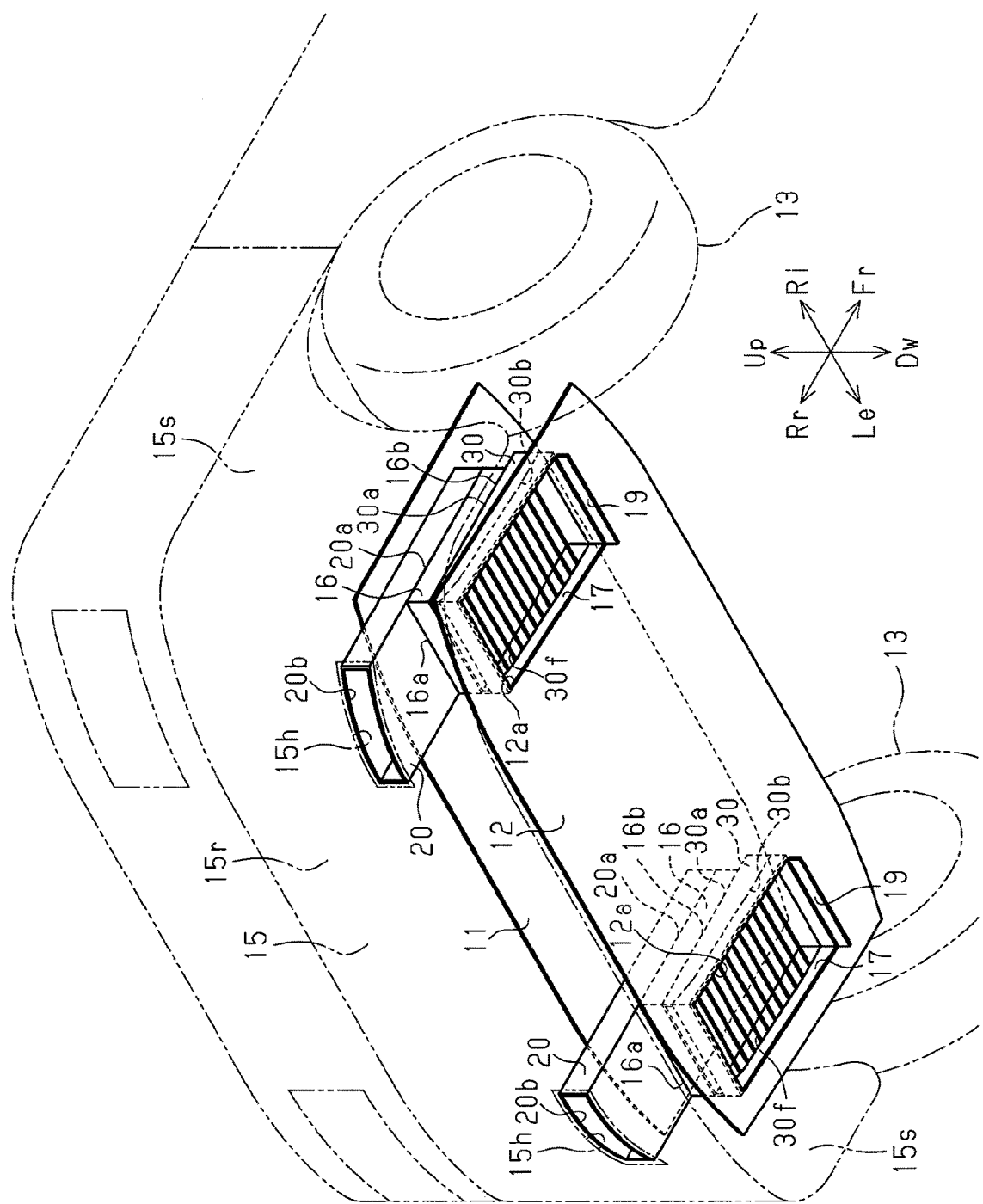
FIG. 1 is a perspective view showing a lower structure of a vehicle.
Figure 2:
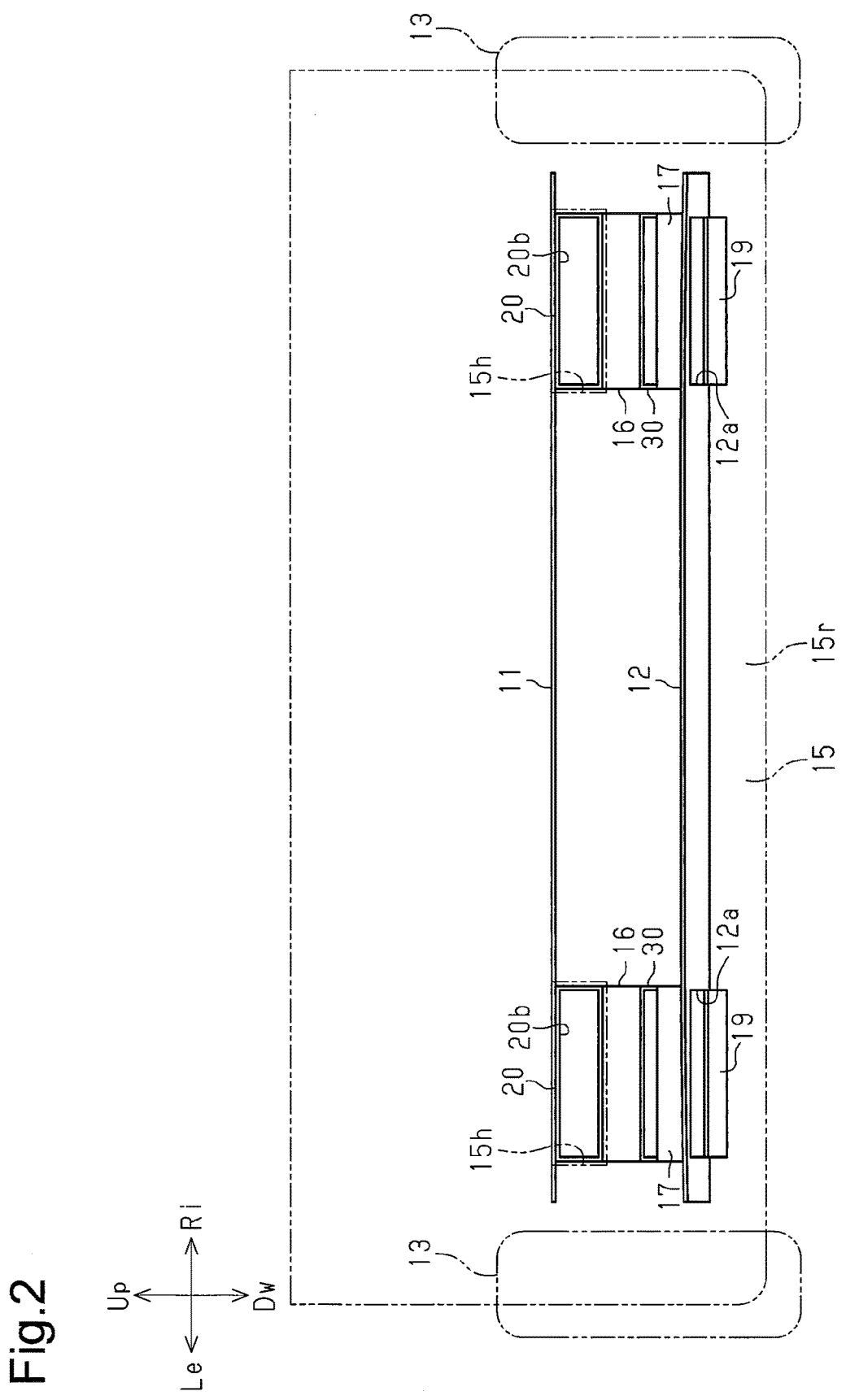
FIG. 2 is a diagram showing the rear part of the vehicle.
Figure 3:
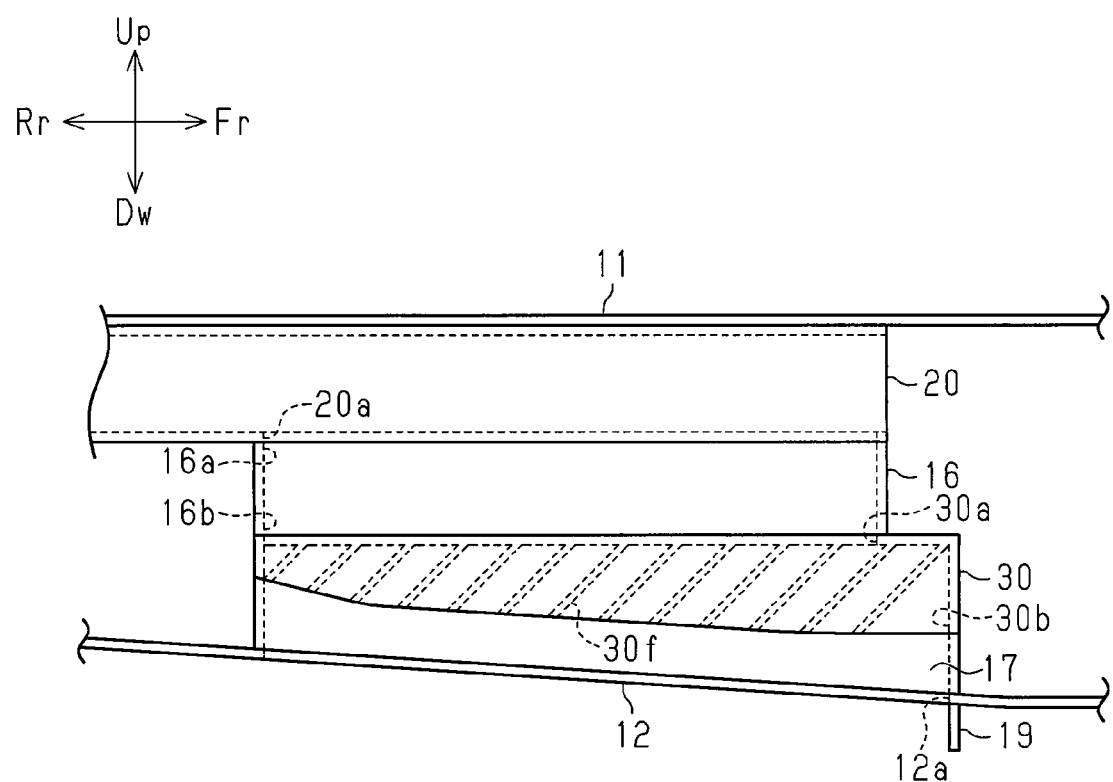
FIG. 3 is a side view mainly showing a duct structure when the vehicle is viewed from the right side.

A vehicle duct structure according to one embodiment will now be described with reference to FIGS. 1 to 3. The duct structure is employed in an electric vehicle that is driven by a drive motor. In FIGS. 1 to 3, arrows Up and Dw designate the upper side and the down side of the vehicle, respectively. In FIGS. 1 and 2, arrows Le and Ri designate the left side and the right side of the vehicle that is oriented forward, respectively. In FIGS. 1 and 3, arrows Fr and Rr designate the front side and the rear side of the vehicle, respectively. In the following description, the "width direction of the vehicle" will be referred to simply as the "width direction."

As shown in FIG. 1, on the rear side of the vehicle, a substantially plate-shaped rear floor panel 11 is disposed in the lower part of the vehicle. The rear floor panel 11 defines the floor surface of the vehicle behind rear tires 13, e.g., the floor surface of the trunk. A substantially plate-shaped undercover 12 is disposed below the rear floor panel 11 so as to face the rear floor panel 11. The undercover 12 is fixed to the frame, which is the main body of the vehicle, in a state in which a predetermined distance exists between the undercover 12 and the rear floor panel 11.

A rear bumper 15, which is also called a rear bumper spoiler, is disposed behind the rear tire 13. The rear bumper 15 is formed so as to surround the rear floor panel 11 from the outside and the rear side. The rear bumper 15 is composed of a rear wall portion 15r, which extends over the entirety in the width direction of the vehicle, and a pair of sidewall portions 15s, which extend forward from the opposite ends of the rear wall portion 15r. The front edge of the sidewall portion 15s is recessed rearward in an arcuate shape. The front edge of the sidewall portion 15s is connected to the outside edge of the rear wheel well (not shown) which covers the rear tire 13 from above. The rear bumper 15 is fixed to the main body. A rear surface of the rear wall portion 15r defines a part of the rear end face of the vehicle, which is positioned below the tail lamps and the back door. FIGS. 1 and 2 depict the rear bumper 15 with phantom lines, and also show the inner structure of the rear bumper 15.

As shown in FIG. 1, a pair of air intake ducts 20 is fixed to the lower surface of the rear floor panel 11. The air intake ducts 20 are disposed at positions away from the center in the width direction of the vehicle at equal distances, respectively. The air intake duct 20 is formed in a flat, substantially rectangular box shape. In more detail, the size in the width direction of the air intake duct 20 is larger than the size in the vertical direction of the air intake duct 20. The air intake duct 20 extends in the front-rear direction along the lower surface of the rear floor panel 11. The upper surface of the air intake duct 20 is fixed to the lower surface of the rear floor panel 11 by means of bolts or the like (not shown).

An intake port 20b, which is open to the outside of the vehicle, is opened in the rear end face of the air intake duct 20. The intake port 20b of the air intake duct 20 is open rearward from the vehicle. As shown in FIGS. 1 and 3, in the lower surface of the air intake duct 20, an inflow port 20a, which is open to the inside of the vehicle, is opened in the front of the air intake duct 20.

As shown in FIGS. 1 and 2, an air-cooled type oil cooler 16, which is an object to be cooled, is fixed to the lower surface of each air intake duct 20. Each oil cooler 16 is provided for one of the air intake ducts 20. Each oil cooler 16 is formed in a flat, rectangular box shape. The size in the width direction of the oil cooler 16 is larger than the size in the vertical direction of the oil cooler 16. The size in the width direction of the oil cooler 16 is substantially equal to the size in the width direction of the air intake duct 20. As shown in FIG. 1, the oil cooler 16 extends in the front-rear direction along the lower surface of the air intake duct 20. The size in the front-rear direction of the oil cooler 16 is smaller than the size in the front-rear direction of the air intake duct 20.

As shown in FIGS. 1 and 3, an upstream-side opening portion 16a communicating with the inside of the oil cooler 16 is provided in the upper surface of the oil cooler 16. The upstream-side opening portion 16a is provided in substantially the whole area of the upper surface of the oil cooler 16. The oil cooler 16 is fixed to the lower surface of the air intake duct 20 in a state in which the upstream-side opening portion 16a is directed to the inflow port 20a of the air intake duct 20. The oil cooler 16 is fixed to the front of the air intake duct 20 in the lower surface of the air intake duct 20. The inside of the oil cooler 16 communicates with the inside of the air intake duct 20 through the upstream-side opening portion 16a. A downstream-side opening portion 16b is provided in the lower surface of the oil cooler 16. The downstream-side opening portion 16b is provided in substantially the whole area of the lower surface of the oil cooler 16.

A plurality of oil flow passages (not shown) is provided inside the oil cooler 16. For example, oil that has been warmed by the drive motor, which drives the rear tires 13, is supplied to the inside of each oil flow passage. The oil is cooled through by the heat exchange in each of the oil flow passages of the oil cooler 16, and thereafter is again supplied to the drive motor and the like in order to cool the drive motor and the like.

As shown in FIG. 1, an exhaust duct 30 is fixed to the lower surface of each of the oil coolers 16. Each exhaust duct 30 is provided for one of the pair of oil coolers 16. As shown in FIGS. 1 and 2, each exhaust duct 30 is formed in a flat, rectangular box shape. The size in the width direction of the exhaust duct 30 is larger than the size in the vertical direction of the exhaust duct 30. The size in the width direction of the exhaust duct 30 is substantially equal to the size in the width direction of the oil cooler 16. The exhaust duct 30 extends in the front-rear direction along the lower surface of the oil cooler 16. The size in the front-rear direction of the exhaust duct 30 is larger than the size in the front-rear direction of the oil cooler 16.

As shown in FIGS. 1 and 3, an outflow port 30a, which is open to the inside of the vehicle, is opened in the upper surface of the exhaust duct 30. The exhaust duct 30 is fixed to the lower surface of the oil cooler 16 in a state in which the outflow port 30a is directed to the downstream-side opening portion 16b of the oil cooler 16. The inside of the exhaust duct 30 communicates with the inside of the oil cooler 16 through the outflow port 30a. An exhaust port 30b, which is open to the outside of the vehicle, is opened in the lower surface of the exhaust duct 30. The exhaust port 30b is provided in substantially the whole area of the lower surface of the exhaust duct 30, and is open downward from the vehicle. The exhaust duct 30 is positioned above the undercover 12.

As shown in FIG. 1, a plurality of plate-shaped fins 30f is disposed inside each exhaust duct 30. The fins 30f extend in the width direction of the vehicle. The opposite ends of the fins 30f are connected to inner surfaces of the opposite side walls of the exhaust duct 30, respectively. As shown in FIG. 3, each fin 30f is inclined so that its lower end is placed at a position posterior to its upper end. The fins 30f are disposed in parallel with each other.

As shown in FIGS. 1 and 2, two insertion holes 15h, which extends through the rear wall portion 15r in the thickness direction, are provided in the rear wall portion 15r of the rear bumper 15. The two insertion holes 15h are disposed at positions away from the center in the width direction of the vehicle at equal distances, respectively. Each insertion hole 15h has substantially the same external shape as the rear end of the air intake duct 20, and is formed in a quadrangular shape. The rear end of the air intake duct 20 is inserted in the insertion hole 15h. The rear wall portion 15r of the rear bumper 15 is placed at a position posterior to the rear tires 13. Therefore, the intake ports 20b of the air intake ducts 20 inserted in the insertion holes 15h of the rear bumper 15 are also placed at positions posterior to the rear tires 13. Additionally, the rear wall portion 15r of the rear bumper 15 defines a part of the rear end face of the vehicle. Therefore, the intake ports 20b of the air intake ducts 20 are opened in the rear end face of the vehicle.

As shown in FIGS. 1 and 3, the undercover 12 has opening portions 12a, which extend through the undercover 12 in the thickness direction. Each opening portion 12a is identical in shape and in size with the exhaust port 30b of the exhaust duct 30, and is formed in a substantially quadrangular shape. The opening portion 12a is placed at a position facing the exhaust port 30b of the exhaust duct 30. A plate-shaped peripheral wall portion 17 vertically protrudes upward from the upper surface of the undercover 12. The peripheral wall portion 17 protrudes to substantially the same height position as the lower surface of the exhaust duct 30. The peripheral wall portion 17 extends so as to surround the entirety of the opening portion 12a along the edge of the opening portion 12a. Therefore, the peripheral wall portion 17 is formed in a quadrangular frame shape as a whole.

A plate-shaped shielding wall 19 vertically protrudes downward from the lower surface of the undercover 12. The shielding wall 19 extends in the width direction of the vehicle along the front edge of the opening portion 12a of the undercover 12. The shielding wall 19 extends over the whole area of the front edge of the opening portion 12a of the undercover 12. As described above, the opening portion 12a of the undercover 12 faces the exhaust port 30b of the exhaust duct 30. Therefore, the shielding wall 19 of the undercover 12 is placed at a position anterior to the exhaust port 30b of the exhaust duct 30.

An operation and advantages of the above-described vehicle duct structure will now be described.

The intake port 20b of the air intake duct 20 is opened at a position posterior to the rear tire 13. The position posterior to the rear tire 13 is a position at which a vehicle door is unlikely to be mounted. Therefore, it is possible to dispose the air intake duct 20 while avoiding the surroundings of the rear wheel well, at which components related to a vehicle door are mounted. As a result, the number of vehicle types to which the air intake duct 20 is applicable is increased, and the versatility of the air intake duct 20 is improved.

When a vehicle having the aforementioned duct structure travels, an airflow is generated under the undercover 12. Air at this time flows rearward from the vehicle at a corresponding speed. Therefore, the static pressure of the air under the undercover 12 becomes lower than the static pressure of the air at the position posterior to the rear wall portion 15r of the rear bumper 15. Therefore, according to the aforementioned duct structure, air flows from the intake port 20b of the air intake duct 20, which is opened in the rear wall portion 15*r* of the rear bumper 15, to the exhaust port 30*b* of the exhaust duct 30, which is open downward from the vehicle.

Air that has flowed into the air intake duct 20 from the intake port 20*b* of the air intake duct 20 is supplied to the inside of the oil cooler 16 through the inflow port 20*a* of the air intake duct 20 and through the upstream-side opening portion 16*a* of the oil cooler 16. Air that has been supplied to the inside of the oil cooler 16 is warmed by undergoing the heat exchange between this air and oil flowing in the oil flow passage. The air is discharged and flows into the exhaust duct 30 through the downstream-side opening portion 16*b* of the oil cooler 16 and through the outflow port 30*a* of the exhaust duct 30. Thereafter, the air is discharged from the exhaust port 30*b* of the exhaust duct 30, and is then discharged downward from the vehicle through the opening portion 12*a* of the undercover 12.

The plate-shaped shielding wall 19 vertically protrudes downward from the lower surface of the undercover 12. The shielding wall 19 extends in the width direction of the vehicle along the front edge of the opening portion 12*a* of the undercover 12. Therefore, when air flows under the undercover 12 in response to the traveling of the vehicle, a rearward airflow from the vehicle is obstructed by the shielding wall 19. Therefore, the static pressure of air becomes high at a position anterior to the shielding wall 19, whereas the static pressure of air becomes low at a position posterior to the shielding wall 19. As thus described, the static pressure thereof becomes low at a position posterior to the shielding wall 19, i.e., becomes low directly under the exhaust port 30*b* of the exhaust duct 30. Accordingly, the airflow toward the exhaust port 30*b* is promoted in the exhaust duct 30. Particularly when the traveling speed of the vehicle is low, the airflow running under the undercover 12 is not so fast. Therefore, the static pressure of air under the undercover 12 is not easily lowered. In this case, the airflow-promoting effect produced by the shielding wall 19 is remarkable.

Additionally, the peripheral wall portion 17 is provided on the upper surface of the undercover 12 so as to surround the opening portion 12*a*. Therefore, air existing between the rear floor panel 11 and the undercover 12 does not easily flow into the opening portion 12*a* of the undercover 12. Additionally, air under the undercover 12 does not easily flow into the space between the rear floor panel 11 and the undercover 12 through the opening portion 12*a*. Therefore, the flow of exhaust gases discharged downward from the undercover 12 through the opening portion 12*a* of the undercover 12 from the exhaust port 30*b* of the exhaust duct 30 is not easily disturbed.

The intake port 20*b* of the air intake duct 20 is opened in the rear wall portion 15*r* of the rear bumper 15, and is open rearward from the vehicle. Therefore, it becomes difficult for foreign substances, along with air flowing from the front side of the vehicle, to infiltrate into the intake port 20*b* of the air intake duct 20 during vehicle traveling. Additionally, it becomes difficult for dust or the like that has been stirred up by the rear tire 13 to infiltrate into the intake port 20*b* of the air intake duct 20.

In a vehicle in which an internal combustion engine is mounted at a position anterior to the passenger compartment, the exhaust pipe extends rearward from the internal combustion engine. Therefore, in this type of vehicle, a space to arrange the exhaust pipe, a muffler, and the like, is provided under the rear floor panel 11 and other floor panels. Additionally, in this type of vehicle, an opening through which the downstream-side end of the exhaust pipe is inserted is provided in the rear bumper 15.

In the aforementioned embodiment, the aforementioned duct structure is applied to an electric vehicle driven by a motor. In other words, the aforementioned duct structure is applied to a vehicle that does not have an exhaust pipe, a muffler, or the like. Therefore, in a vehicle in which an internal combustion engine is mounted, it is also possible to use the space under the rear floor panel 11 at which an exhaust pipe or a muffler is placed as an arrangement space for the air intake duct 20, the oil cooler 16, the exhaust duct 30, or the like. Therefore, it is possible to share a vehicle body between a vehicle having an internal combustion engine and an electric vehicle. Additionally, the rear end of the air intake duct 20 is inserted in the insertion hole 15*h* of the rear bumper 15. Therefore, in a vehicle in which an internal combustion engine is mounted, it is also possible to employ an opening of a rear bumper through which a downstream-side end of an exhaust pipe is inserted as the insertion hole 15*h* of the rear bumper 15. Therefore, it is possible to apply the aforementioned duct structure to an electric vehicle without greatly changing the design of the rear end face of the vehicle.

The above-illustrated embodiment may be modified as follows.

The air intake duct 20 is not limited to the flat, substantially rectangular box shape in which the size in the width direction is longer than the size in the vertical direction. For example, the air intake duct 20 may be formed in a substantially rectangular box shape in which the size in the vertical direction and the size in the width direction are equal to each other, or may be formed in a cylindrical shape that extends in the front-rear direction. In short, the shape of the air intake duct 20 is arbitrary as long as the air intake duct 20 includes the inflow port 20*a* and the intake port 20*b*.

The intake port 20*b* of the air intake duct 20 may be opened in the sidewall portion 15*s* of the rear bumper 15 as long as it is placed at a position posterior to the rear tire 13.

The intake port 20*b* of the air intake duct 20 is not necessarily required to be opened in the rear bumper 15. For example, the intake port 20*b* may be opened in an aerodynamic member (spoiler) or another member placed at a position below the rear bumper 15. Additionally, the intake port 20*b* may be open rearward from the vehicle at a position below the rear bumper 15.

The intake port 20*b* of the air intake duct 20 or the inside of the air intake duct 20 may be provided with a filter that is used to prevent the intrusion of foreign substances.

The exhaust duct 30 is not limited to the flat, substantially rectangular box shape in which the size in the width direction is longer than the size in the vertical direction. For example, the exhaust duct 30 may be formed in a substantially rectangular box shape in which the size in the vertical direction and the size in the width direction are equal to each other, or may be formed in a cylindrical shape that extends in the vertical direction. In short, the shape of the exhaust duct 30 is arbitrary as long as the exhaust duct 30 communicates with the oil cooler 16 through the outflow port 30*a* and includes the exhaust port 30*b* that is open downward.

The exhaust port 30*b* of the exhaust duct 30 may be disposed at a part of the lower surface of the exhaust duct 30.

A filter that is used to prevent the intrusion of foreign substances may be provided instead of or in addition to the fin 30*f* provided in the exhaust duct 30.

The oil cooler 16 is not limited to the flat, substantially rectangular box shape in which the size in the width direction is longer than the size in the vertical direction. For example, the oil cooler 16 may be formed in a substantially rectangular box shape in which the size in the vertical direction and the size in the width direction are equal to each other, or may be formed in a cylindrical shape that extends in the vertical direction. In short, the shape of the oil cooler 16 is arbitrary as long as the oil cooler 16 includes the upstream-side opening portion 16a and the downstream-side opening portion 16b and if the inside of the oil cooler 16 is provided with an oil flow passage.

The downstream-side opening portion 16b may be disposed at a part of the lower surface of the oil cooler 16 as long as the downstream-side opening portion 16b of the oil cooler 16 enables the oil cooler 16 and the exhaust duct 30 to communicate with each other.

The oil cooler 16 is not necessarily required to be fixed to the lower surface of the air intake duct 20. For example, the oil cooler 16 may be fixed to one of the opposite sides of the air intake duct 20.

The shielding wall 19 may be disposed only at a part of the front edge of the opening portion 12a of the undercover 12. Additionally, the shielding wall 19 may be omitted. The static pressure of air under the undercover 12 becomes low if the vehicle travels at an adequate speed even if the shielding wall 19 is omitted. Therefore, air flows from the air intake duct 20 to the exhaust duct 30 through the inside of the oil cooler 16.

An object to be cooled by the air intake duct 20 and by the exhaust duct 30 may be a drive motor or a battery besides the oil cooler 16.

The peripheral wall portion 17 may be disposed only at a part of the opening edge of the opening portion 12a of the undercover 12. Air is apt to flow rearward from the vehicle also between the undercover 12 and the rear floor panel 11 during vehicle traveling. Therefore, it is preferable to dispose the peripheral wall portion 17 at the front edge of the opening portion 12a in order not to disturb the airflow from the exhaust port 30b of the exhaust duct 30.

The peripheral wall portion 17 of the undercover 12 may be omitted. For example, the influence caused by omitting the peripheral wall portion 17 is small if the structure is formed such that the interval between the undercover 12 and the rear floor panel 11 is short and therefore air does not easily flow therebetween.

The undercover 12 may be omitted. In this case, the same advantages as in the aforementioned embodiment are achieved by disposing the shielding wall 19 at the front edge of the exhaust port 30b of the exhaust duct 30.

A blower fan that promotes airflow may be disposed inside the air intake duct 20 or inside the exhaust duct 30.

The air intake duct 20 and the exhaust duct 30 of the aforementioned embodiment may be applied to a vehicle in which an internal combustion engine is mounted. In this case, the object to be cooled that is cooled by the air intake duct 20 and by the exhaust duct 30 may be, for example, the radiator, which cools the internal combustion engine or may be, for example, the internal combustion engine.

The invention claimed is:

1. A vehicle duct structure comprising:
   an air intake duct, which supplies air from outside to an object to be cooled mounted at a position below a floor panel of a vehicle; and
   an exhaust duct, which discharges air supplied to the object to be cooled to outside of the vehicle, wherein
   the exhaust duct includes an exhaust port, which is open to the outside of the vehicle and is open downward from the vehicle,
   the intake duct includes an intake port, which is open to the outside of the vehicle, and
   the intake port is located at a position posterior to rear tires of the vehicle and opened rearward from the vehicle.

2. The vehicle duct structure according to claim 1, wherein
   a shielding wall protrudes in a vertical direction at a position anterior to the exhaust port, and
   the shielding wall extends in a width direction of the vehicle at a position below the exhaust port.

3. The vehicle duct structure according to claim 2, wherein
   a plate-shaped undercover is disposed below the floor panel so as to face the floor panel,
   the undercover is provided with an opening portion that extends through the undercover in a thickness direction,
   the opening portion is disposed so as to face the exhaust port,
   the undercover includes a peripheral wall portion that vertically protrudes upward so as to surround the opening portion.

4. The vehicle duct structure according to claim 2, wherein
   a plate-shaped undercover is disposed below the floor panel so as to face the floor panel,
   the undercover is provided with an opening portion that extends through the undercover in a thickness direction,
   the opening portion is disposed so as to face the exhaust port,
   the shielding wall extends in the width direction of the vehicle along a front edge of the opening portion of the undercover.

5. The vehicle duct structure according to claim 1, wherein the intake port is opened in a rear end face of the vehicle.

* * * * *